Nov. 20, 1956     J. G. BAKER     2,771,007
OBJECTIVES COMPRISING TWO OUTER POSITIVE
DOUBLETS ENCLOSING A MIDDLE NEGATIVE
COMPONENT FOR AERIAL PHOTOGRAPHY
Filed Jan. 15, 1953

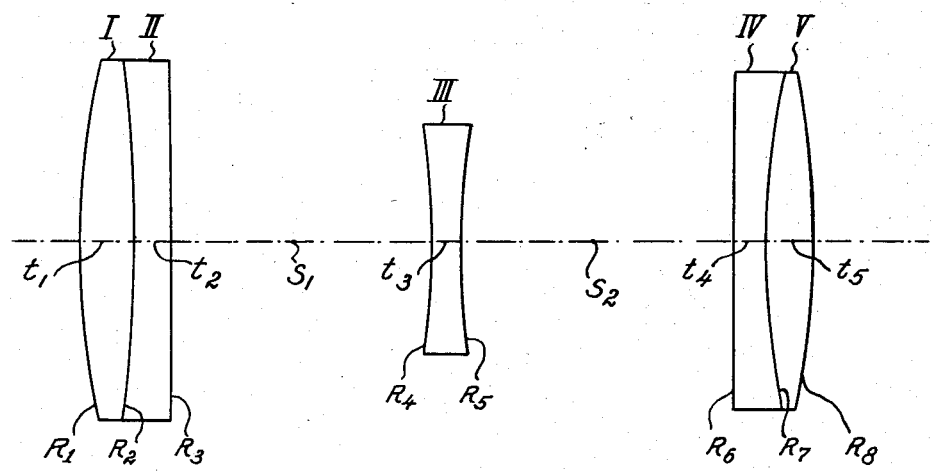

$f = 1.000$           $f/8.0$

| Lens | $N_D$ | $v$ | Radii | Thicknesses and Spaces |
|------|-------|------|-------|------------------------|
| I    | 1.611 | 57.2 | $R_1 = 0.315$ | $t_1 = 0.0223$ |
| II   | 1.529 | 51.6 | $R_2 = -0.519$ | $t_2 = 0.0147$ |
|      |       |      | $R_3 = 8.49$ | $S_1 = 0.107$ |
| III  | 1.620 | 36.2 | $R_4 = -0.358$ | $t_3 = 0.0110$ |
|      |       |      | $R_5 = 0.265$ | $S_2 = 0.114$ |
| IV   | 1.529 | 51.6 | $R_6 = \infty$ | $t_4 = 0.0129$ |
| V    | 1.611 | 57.2 | $R_7 = 0.302$ | $t_5 = 0.0203$ |
|      |       |      | $R_8 = -0.304$ | $BL = 0.302$ |

$BL$ = Overall barrel length

INVENTOR
James G. Baker
BY
Pennie Edmonds Morton Barrows Taylor
ATTORNEYS

United States Patent Office 2,771,007
Patented Nov. 20, 1956

2,771,007

OBJECTIVES COMPRISING TWO OUTER POSITIVE DOUBLETS ENCLOSING A MIDDLE NEGATIVE COMPONENT FOR AERIAL PHOTOGRAPHY

James G. Baker, Winchester, Mass., assignor to The Perkin-Elmer Corporation, Norwalk, Conn., a corporation of New York Application January 15, 1953, Serial No. 331,349

2 Claims. (Cl. 88—57)

This invention relates to photographic objectives and is concerned more particularly with a novel objective for use in high altitude aerial photography. The new objective is corrected for longitudinal and lateral chromatic aberration, spherical aberration, coma, astigmatism, field curvature, and distortion. In addition, at a given speed, such as $f/8$, the higher order aberrations of the lens, including chromatic spherical aberration, higher order astigmatism and field curvature, and unsymmetrical comatic-like errors, can all be held within acceptable limits. Similarly, the oblique spherical aberration of the lens can be confined to a value, which may be tolerated in the type of work for which the lens is to be used.

The new lens is of long focal length and moderate field angle and it is intended for use in making pictures of large format. Thus, in its preferred forms, the lens has a focal length of 96″ in one case and of 144″ in another and both forms of the lens may be employed in making pictures of a size of 9″ x 18″ or 18″ x 36″. The lens gives the desired angular coverage and resolution at the specified focal lengths and its complexity of construction is minimized for the performance required.

The lens is of the type known as the "Pentac" or "Dynar," and it includes a pair of positive compounded components with a negative component between them. The positive components are doublets and each is made of an outer positive element, usually biconvex, and an inner negative element, ordinarily biconcave. The central component is a simple dispersive element. All surfaces in the lens are of spherical curvature and the optical materials used are conventional glasses. The elements of each doublet may be cemented together or separated by a small air space but, for convenience, the opposed surfaces of the elements of each doublet will be referred to as a "cemented surface."

In the new lens, the use of the doublets is favorable to the reduction of the lens curvatures for a given nearly zero Petzval sum and is also favorable to the possibility of correcting the lens for oblique spherical aberration. The latter correction is achieved by the use of the cemented surfaces within the doublets, these surfaces both being curved away from the central stop. The lower rim ray is refracted strongly by the cemented surface within the front doublet and compensates the over-correcting tendency of the front surface of the central negative element. In like manner, the over-correcting tendency of the rear surface of the central negative element on the upper rim ray is compensated by the cemented surface in the rear doublet. By proper choice of the change in index of refraction across the cemented surfaces referred to and by employing proper curvatures for such surfaces, it is possible to provide effective correction of oblique spherical aberration. In the new lens, the change in index across the internal surfaces is unusually high, as will be apparent from the data for specific examples to follow.

A novel feature of the new lens is the high value of the index of refraction of the central dispersive element, this index being higher than that of any other element of the lens. Also, in the preferred forms of the lens, the central element has a lower V-value than any other element. In prior lenses of the Pentac form, the positive element of each doublet commonly has a higher index and a higher V-value than the negative element of that doublet, although the positive element of one doublet, frequently the front, may have an index lower than that of the negative element of the rear doublet. Also, in all prior Pentac lenses, with which I am familiar, the central element has an index lower than that of either positive element of the doublets. In a number of published examples of the Pentac lens, the three negative elements of the lens are made of the same glass, while, in other cases, the central negative element has a lower index and a higher V-value than the negative element of one of the doublets, usually the rear one. The use in the new lens of a glass for the central element, which has an index higher than that of any other element, is one factor contributing to the performance of the lens.

For a better understanding of the invention, reference may be made to the accompanying drawing, which illustrates a typical embodiment of the invention.

The data for two forms of the new lens are given in the following tables, in which $R_1$, $R_2$, . . . represent the radii of curvature of the individual surfaces starting at the front, $t_1$, $t_2$, . . . represent the axial thicknesses of the elements, and $S_1$ and $S_2$ represent the axial air separations between the components. The tables also give the indices of refraction and the V-values of the materials used for the individual elements. The overall barrel length is designated BL.

Example I

[$f = 1.000$    $f/8.0$]

| Lens | $N_D$ | V | Radii | Thicknesses and Spaces |
|---|---|---|---|---|
| I | 1.611 | 57.2 | $R_1 = 0.315$ | $t_1 = 0.0223$ |
| II | 1.529 | 51.6 | $R_2 = -0.519$ | $t_2 = 0.0147$ |
|  |  |  | $R_3 = 8.49$ | $S_1 = 0.107$ |
|  |  |  | $R_4 = -0.358$ |  |
| III | 1.60 | 36.2 |  | $t_3 = 0.0110$ |
|  |  |  | $R_5 = 0.265$ | $S_2 = 0.114$ |
| IV | 1.529 | 51.6 | $R_6 = \infty$ | $t_4 = 0.0129$ |
|  |  |  | $R_7 = 0.302$ |  |
| V | 1.611 | 57.2 |  | $t_5 = 0.0203$ |
|  |  |  | $R_8 = -0.304$ | BL = 0.302 |

The lens of Example I may be advantageously employed in a form having a focal length of 96″.

Example II

[$f = 1.000$    $f/8.0$]

| Lens | $N_D$ | V | Radii | Thicknesses and Spaces |
|---|---|---|---|---|
| I | 1.611 | 57.2 | $R_1 = 0.315$ | $t_1 = 0.0223$ |
| II | 1.529 | 51.6 | $R_2 = -0.519$ | $t_2 = 0.0147$ |
|  |  |  | $R_3 = 8.49$ | $S_1 = 0.107$ |
|  |  |  | $R_4 = -0.358$ |  |
| III | 1.620 | 36.2 |  | $t_3 = 0.0110$ |
|  |  |  | $R_5 = 0.265$ | $S_2 = 0.114$ |
| IV | 1.529 | 51.6 | $R_6 = \infty$ | $t_4 = 0.0116$ |
|  |  |  | $R_7 = 0.297$ |  |
| V | 1.611 | 57.2 |  | $t_5 = 0.0197$ |
|  |  |  | $R_8 = -0.304$ | BL = 0.300 |

The lens of Example II may be advantageously employed in a form having a focal length of 144".

It will be observed from the examples that the new lens is characterized by relatively short barrel length and, as a consequence, by reduced astigmatism for moderate to large field angles. Such large lenses as those of the examples are necessarily limited by secondary spectrum, when ordinary glass types are used, but the secondary spectrum of the lenses of both examples is corrected approximately for sodium light, this correction being favorable in the use of the lenses in aerial photography with a yellow or red filter for penetration of atmospheric haze. The residual high order astigmatism together with uncorrected secondary spectrum then tend to give a favorable depth of focus, which is highly desirable in the case of such large lenses.

In the lenses of the examples, one glass is used for both positive elements of the doublets and another glass is used for the negative elements of both doublets. As a consequence, both positive elements have the same index of refraction, and both negative elements also have the same index. This is not essential and lenses of the invention may include positive elements of quite different index in the front and rear doublets and negative elements of quite different index in the doublets. It is essential that the positive element in each doublet have a higher index than its related negative element and that the central negative element have the highest index in the lens. The change in index across each internal surface in a doublet should be high and amounting to at least 0.05.

A feature of the lens, which contributes to its performance, is the relation between the curvatures of the cemented surfaces of the doublets. The cemented surface of the rear doublet is more strongly curved than the cemented surface of the front doublet, and the numerical value of the ratio of the radius of the cemented surface of the rear doublet to the radius of the cemented surface of the front doublet lies between 0.4 and 1. In the lenses of Examples I and II, the numerical values of the ratio are .582 and .572, respectively.

I claim:

1. A lens having numerical data substantially as follows:

[*f*=1.000    *f*/8.0]

| Lens | N D | V | Radii | Thicknesses and Spaces |
|---|---|---|---|---|
| I | 1.611 | 57.2 | $R_1$= 0.315 | $t_1$=0.0223 |
| II | 1.529 | 51.6 | $R_2$=−0.519 | $t_2$=0.0147 |
|  |  |  | $R_3$= 8.49 | $S_1$=0.107 |
| III | 1.620 | 36.2 | $R_4$= 0.358 | $t_3$=0.0110 |
|  |  |  | $R_5$= 0.265 | $S_2$=0.114 |
| IV | 1.529 | 51.6 | $R_6$= ∞ | $t_4$=0.0129 |
| V | 1.611 | 57.2 | $R_7$= 0.302 | $t_5$=0.0203 |
|  |  |  | $R_8$=−0.304 | BL=0.302 | in which $R_1, R_2, \ldots$ represent radii of surfaces beginning at the left, $t_1, t_2, \ldots$ represent the axial thicknesses of the individual elements, $S_1$ and $S_2$ represent the axial air separations between the components, and BL represents the overall barrel length.

2. A lens having numerical data substantially as follows:

[*f*=1.000    *f*/8.0]

| Lens | N D | V | Radii | Thicknesses and Spaces |
|---|---|---|---|---|
| I | 1.611 | 57.2 | $R_1$= 0.315 | $t_1$=0.0223 |
| II | 1.529 | 51.6 | $R_2$=−0.519 | $t_2$=0.0147 |
|  |  |  | $R_3$= 8.49 | $S_1$=0.107 |
| III | 1.620 | 36.2 | $R_4$=−0.358 | $t_3$=0.0110 |
|  |  |  | $R_5$= 0.265 | $S_2$=0.114 |
| IV | 1.529 | 51.6 | $R_6$= ∞ | $t_4$=0.0116 |
| V | 1.611 | 57.2 | $R_7$= 0.297 | $t_5$=0.0197 |
|  |  |  | $R_8$=−0.304 | BL=0.300 | in which $R_1, R_2, \ldots$ represent radii of surfaces beginning at the left, $t_1, t_2, \ldots$ represent the axial thicknesses of the individual elements, $S_1$ and $S_2$ represent the axial air separations between the components, and BL represents the overall barrel length.

References Cited in the file of this patent

UNITED STATES PATENTS

| | | |
|---|---|---|
| 1,421,156 | Booth | June 27, 1922 |
| 2,279,384 | Altman | Apr. 14, 1942 |
| 2,336,301 | Schade et al. | Dec. 7, 1943 |
| 2,417,736 | Cox | Mar. 18, 1947 |
| 2,443,156 | Altman et al. | June 8, 1948 |
| 2,645,154 | Tronnier | July 14, 1953 |
| 2,645,156 | Tronnier | July 14, 1953 |

FOREIGN PATENTS

| | | |
|---|---|---|
| 300,468 | Great Britain | Nov. 15, 1928 |
| 535,480 | Great Britain | Apr. 10, 1941 |
| 568,319 | Great Britain | Mar. 29, 1945 |
| 601,837 | Great Britain | May 13, 1948 |